US010843264B2

(12) United States Patent
Maruyama et al.

(10) Patent No.: US 10,843,264 B2
(45) Date of Patent: Nov. 24, 2020

(54) MOLDING DIE AND MOLDING METHOD

(71) Applicant: Diamet Corporation, Niigata-shi (JP)

(72) Inventors: Tsuneo Maruyama, Niigata (JP); Yoshiki Tamura, Niigata (JP); Hideo Sakai, Niigata (JP)

(73) Assignee: Diamet Corporation, Niigata (JP)

( * ) Notice: Subject to any disclaimer, the term of this patent is extended or adjusted under 35 U.S.C. 154(b) by 154 days.

(21) Appl. No.: 16/081,723

(22) PCT Filed: Mar. 3, 2017

(86) PCT No.: PCT/JP2017/008504
§ 371 (c)(1),
(2) Date: Aug. 31, 2018

(87) PCT Pub. No.: WO2017/154775
PCT Pub. Date: Sep. 14, 2017

(65) Prior Publication Data

US 2019/0091767 A1 Mar. 28, 2019

(30) Foreign Application Priority Data

Mar. 8, 2016 (JP) ................................ 2016-044521
Oct. 7, 2016 (JP) ................................ 2016-199240

(51) Int. Cl.
*B29C 43/02* (2006.01)
*B22F 3/03* (2006.01)
(Continued)

(52) U.S. Cl.
CPC ................ *B22F 3/03* (2013.01); *B22F 3/003* (2013.01); *B22F 3/02* (2013.01); *B30B 11/02* (2013.01); *B22F 2003/033* (2013.01)

(58) Field of Classification Search
CPC ......... B29C 43/04; B29C 43/32; B29C 43/36; B29C 43/02; B30B 11/00; B30B 11/02; B30B 11/007
See application file for complete search history.

(56) References Cited

U.S. PATENT DOCUMENTS 4,087,221 A * 5/1978 Munson ................ B30B 11/027 425/78
5,503,795 A * 4/1996 Hubbard .............. B22F 3/1291 419/38
(Continued)

FOREIGN PATENT DOCUMENTS

CN 202291399 U 7/2012
CN 104014787 A 9/2014
(Continued)

OTHER PUBLICATIONS

Chinese Office Action dated Sep. 30, 2019 for the corresponding Chinese Patent Application No. 201780008168.9.
(Continued)

*Primary Examiner* — Joseph S Del Sole
*Assistant Examiner* — Thu Khanh T Nguyen
(74) *Attorney, Agent, or Firm* — Leason Ellis LLP

(57) ABSTRACT

A molding die includes a first die having a through-hole; a second die inserted into the through-hole and configured to be movable relative to the first die; and first and second punches configured to be insertable into the through-hole, wherein an undercut molding part is provided on the second die, and a molding target is compression-molded in a cavity surrounded by inner side walls of the through-hole, the second die, the first punch, and the second punch.

10 Claims, 10 Drawing Sheets

(51) Int. Cl.

| | |
|---|---|
| ***B30B 11/02*** | (2006.01) |
| ***B22F 3/02*** | (2006.01) |
| ***B22F 3/00*** | (2006.01) |

(56) References Cited

U.S. PATENT DOCUMENTS

| | | | | |
|---|---|---|---|---|
| 8,062,014 | B2 * | 11/2011 | Gubanich | ............. B30B 15/022 425/78 |
| 2012/0121362 | A1 | 5/2012 | Taylor et al. | |

FOREIGN PATENT DOCUMENTS

| | | | |
|---|---|---|---|
| CN | 205008573 | U | 2/2016 |
| JP | 48-059085 | A | 8/1973 |
| JP | 51-149106 | A | 12/1976 |
| JP | 52-008551 | B | 3/1977 |
| JP | A-59-043106 | U | 3/1984 |
| JP | 2003-193113 | A | 7/2003 |
| JP | 2004-298917 | A | 10/2004 |
| JP | 2009-068558 | A | 4/2009 |

OTHER PUBLICATIONS

International Search Report dated May 30, 2017 for the corresponding PCT Application No. PCT/JP2017/008504.

Extended European Search Report dated Oct. 10, 2019 for the corresponding European Patent Application No. 17763115.7.

* cited by examiner

MOLDING DIE AND MOLDING METHOD

CROSS-REFERENCE TO RELATED PATENT APPLICATIONS

This application is a U.S. National Phase Application under 35 U.S.C. § 371 of International Patent Application No. PCT/JP2017/008504, filed Mar. 3, 2017, and claims the benefit of Japanese Patent Application No. 2016-044521 filed Mar. 8, 2016 and Japanese Patent Application No. 2016-199240 filed Oct. 7, 2016, all of which are incorporated herein by reference in their entirety. The International Application was published in Japanese on Sep. 14, 2017 as International Publication No. WO/2017/154775 under PCT Article 21(2).

FIELD OF THE INVENTION

The present invention relates to a molding die and a molding method using the molding die.

BACKGROUND OF THE INVENTION

For instance, a method for manufacturing high-precision components by performing die molding using a powder raw material such as a metal powder or a ceramic powder as a molding target and sintering an obtained green compact (a molding) at a high temperature is known (e.g., see Japanese Unexamined Publication No. 2009-68558). In general, a die for powder molding is made up of a hollow die with an opening, and upper and lower punches inserted from the opening of the die into a cavity.

In the die for powder molding having this constitution, for example, in a state in which the lower punch is fitted into a part of the cavity from the opening at one side (the lower side) of the die, and the raw material powder is filled in the cavity. Next, the upper punch is inserted into the cavity from the opening at the other side (the upper side) of the die, and the raw material powder in the cavity is pressurized between the upper punch and the lower punch. Thereby, a green compact modeled after the shape of the cavity is formed. Next, after one of the punches is separated from one of the openings of the die, the other punch pushes out the green compact molded in the cavity. Thereby, the green compact can be ejected (released) from the cavity.

Meanwhile, in order to mold a green compact (a molding) having an undercut shape such as a corrugation (concavo-convex shape) that extends in a direction that intersects moving directions of the upper and lower punches, a die having a plurality of dividable dies has generally been used in the past. In addition, a molding including an undercut shape is manufactured by further mechanically performing undercutting on a molding molded in a simple shape.

Technical Problem

However, in the die having a plurality of dividable dies, a linear protrusion is easily formed on the obtained green compact at a portion at which the die is divided. Therefore, finishing or the like of a molded surface in a post-process is often required, and it is difficult to efficiently manufacture green compacts at a low cost. The green compact (the molding) is easily damaged when the die is divided, and this also makes it difficult to efficiently manufacture green compacts.

The present invention was made in view of the aforementioned circumstances, and is directed to providing a molding die capable of molding a molding including an undercut shape with high precision and with ease, and a molding method using the molding die.

SUMMARY OF THE INVENTION

Solution to Problem

A molding die that is an aspect of the present invention has the following constitution.

The molding die includes: a first die having a through-hole; a second die inserted into the through-hole and configured to be movable relative to the first die; and first and second punches configured to be insertable into the through-hole. An undercut molding part is provided on the second die, and a molding target is compression-molded in a cavity surrounded by inner side walls of the through-hole, the second die, the first punch, and the second punch.

According to the molding die having this constitution, the molding having the undercut shape can be molded with ease and with high precision by simply inserting the second die having the undercut molding part into the through-hole of the first die and performing molding. The molding can be easily released from the second die by simply ejecting the molded molding from the through-hole of the first die along with the second die, and the molding can be molded with high precision without damaging the undercut portion.

The second die may be inserted into the through-hole such that a part of the second die comes into contact with the inner side walls of the through-hole.

The molding die that is the aspect of the present invention may further include a third die inserted into the through-hole such that a part of the third die comes into contact with the inner side walls of the through-hole, and configured to be movable relative to the first and second dies.

The molding die that is the aspect of the present invention may further include a core rod configured to be insertable into the cavity.

In the aspect of the present invention, the molding target may be a powder.

A molding method that is an aspect of the present invention has the following constitution.

The molding method is a molding method using the molding die as described above, and at least includes: an introducing process of inserting the second punch from a second side of the through-hole in an inserting/releasing direction and introducing the molding target into the through-hole; an inserting process of simultaneously inserting the first punch and the second die from a first side of the through-hole; a compacting process of moving the first and second punches toward each other, compression-molding the molding target in the cavity, and molding a molding; and an ejecting process of ejecting the molding from the molding die.

According to the molding method having this constitution, the molding having an undercut shape can be molded with ease and with high precision by simply inserting the second die into the through-hole of the first die and performing molding. The molding can be easily released from the second die by simply ejecting this molding from the through-hole of the first die along with the second die, and the molding can be molded with high precision without damaging the undercut portion.

The ejecting process is a process of pulling the first punch, the second die, and the molding out of the through-hole, moving the second die and the molding relative to the first punch to remove the molding from the first punch, and moving the molding relative to the second die in a direction intersecting (or perpendicular to) the inserting/releasing direction to remove the molding from the second die.

Another molding method that is an aspect of the present invention has the following constitution.

The other molding method is a molding method using the molding die as described above, and at least includes: an introducing process of inserting the second punch and the second die from a second side of the through-hole in an inserting/releasing direction and introducing the molding target into the through-hole; an inserting process of inserting the first punch from a first side of the through-hole; a compacting process of moving the first and second punches toward each other, compression-molding the molding target in the cavity, and molding a molding; and an ejecting process of ejecting the molding from the molding die.

Advantageous Effects of Invention

According to the molding die and molding method of the present invention, the molding die capable of molding a molding including an undercut shape with high precision and with ease, and the molding method using the molding die can be provided.

DETAILED DESCRIPTION THE INVENTION

Hereinafter, a molding die and a molding method that are an embodiment to which the present invention is applied will be described with reference to the drawings. The embodiments shown below will be specifically described so that the gist of the invention can be better understood, and do not limit the present invention unless indicated otherwise. In addition, the drawings used for the following description may show portions that are main parts in an enlarged scale for convenience in order to facilitate understanding of features of the present invention, and dimensional ratios of the components are not necessarily the same as the actual dimensional ratios.

Figure 1:
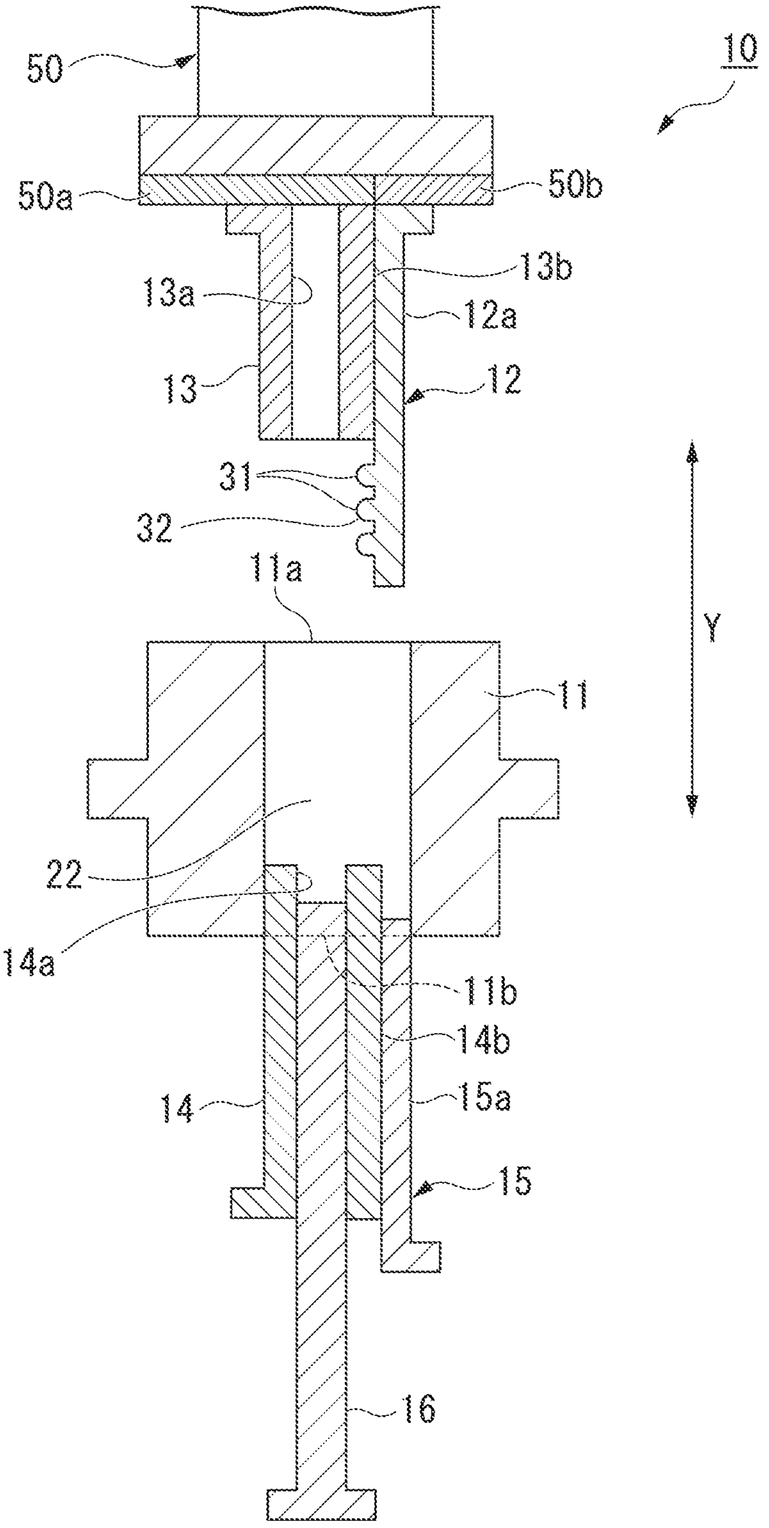
FIG. 1 is a sectional view showing a molding die according to an embodiment of the present invention.
Figure 2:
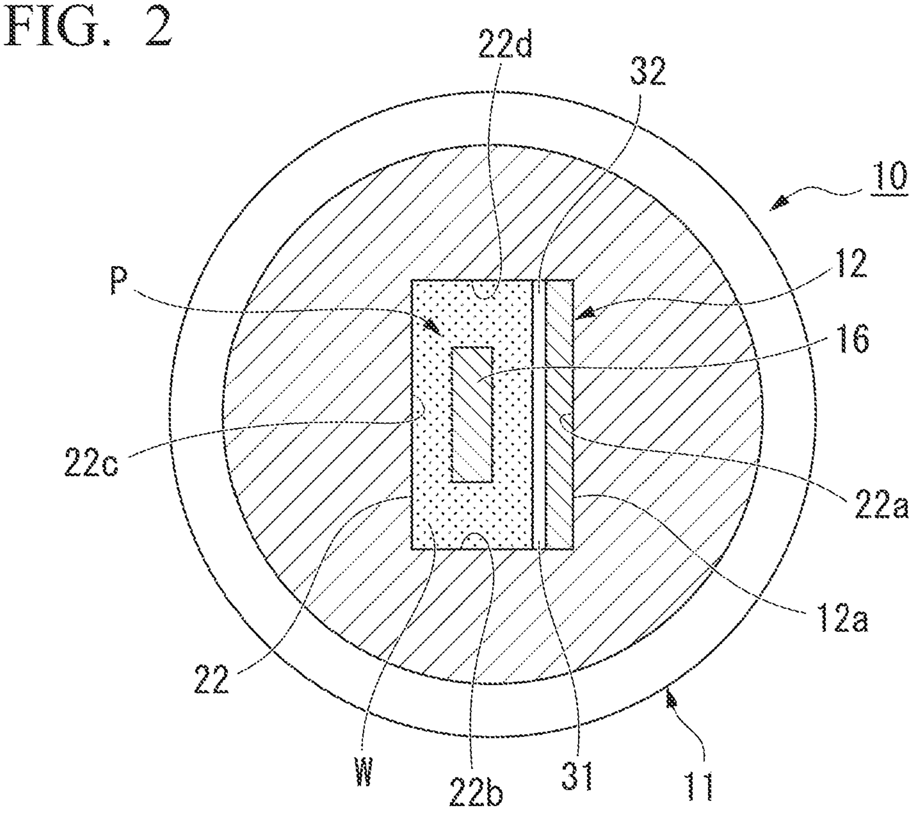
FIG. 2 is an enlarged sectional view of main parts when a second die of the molding die is viewed from above.

FIG. 1 is a sectional view showing a molding die according to an embodiment of the present invention. FIG. 2 is an enlarged sectional view of main parts when a second die of the molding die is viewed from above.

A molding die 10 is a die that uses, for instance, a powder as an example of a molding target and forms a green compact as an example of a molding using compression molding.

The molding die 10 includes a first die 11, a second die 12 that enables relative movement relative to the first die 11, a first punch 13, a second punch 14, a third punch 15, and a core rod 16.

The first die 11 has, for instance, an approximately cylindrical contour, and is formed with a through-hole 22 that passes from first opening 11*a* to the second opening 11*b*. In the present embodiment, the through-hole 22 forms a cuboidal space surrounded by four inner side walls 22*a* to 22*d*.

The second die 12 has, for instance, a plate shape, and is formed with an undercut molding part 32 having a corrugation 31 that extends in a direction intersecting (or perpendicular to) an inserting/releasing direction Y. In the present embodiment, the corrugation 31 formed at the undercut molding part 32 is made up of three projections that protrude in a horizontal direction and have a semicircular cross section. The inserting/releasing direction Y in the present embodiment is a direction in which the first punch 13, the second punch 14, and the second die 12 are inserted into and released from the through-hole 22 of the first die 11.

This undercut molding part 32 gives an undercut shape to the green compact in a molding method to be described below.

The second die 12 is inserted into the through-hole 22 at the time of molding such that an outer surface 12*a* of the second die 12 comes into contact with the inner side wall 22*a* of the through-hole 22 of the first die 11.

The second die 12 comes into contact with a circumferential surface 13*b* of the first punch 13 to be described below, and is formed to be slidable relative to the first punch 13 in the inserting/releasing direction Y.

The first punch 13 is inserted into a part of the through-hole 22 of the first die 11 at the time of molding, and compacts the powder, which is an example of the molding target, in the inserting/releasing direction Y. The first punch 13 has, for instance, an approximately cuboidal contour, and has a through-hole 13*a* formed therein. A part of the core rod 16 to be described below can be inserted into and released from the through-hole 13*a*.

The second punch 14 is formed to face the first punch 13 via the through-hole 22 of the first die 11. The second punch 14 is inserted into the through-hole 22 of the first die 11 at the time of molding, and compacts the powder, which is an example of the molding target, in the inserting/releasing direction Y to put the powder between the first punch 13 and the second punch 14. The second punch 14 has, for instance, an approximately cuboidal contour, and has a through-hole 14*a* formed therein. A part of the core rod 16 to be described below can be inserted into and released from the through-hole 14*a*.

The third punch 15 is an approximately plate-like member formed to face an end of the second die 12. The third punch 15 is inserted into the through-hole 22 such that an outer surface 15*a* of the third punch 15 comes into contact with the inner side wall 22*a* of the through-hole 22 of the first die 11 at the time of molding.

The third punch 15 comes into contact with a circumferential surface 14*b* of the second punch 14, and is formed to be slidable relative to the second punch 14 in the inserting/releasing direction Y.

A space surrounded by the inner side walls 22*b*, 22*c* and 22*d* of the through-hole 22 of the first die 11, the undercut molding part 32 of the second die 12, an end face of the first punch 13, and an end face of the second punch 14 becomes a cavity P. The green compact is molded in this cavity P by compression-molding the powder W that is the molding target.

The core rod 16 is, for instance, an approximately plate-like elongated member, and is disposed to pass through the cavity P from the through-hole 14*a* of the second punch 14 toward the through-hole 13*a* of the first punch 13 in an insertable/releasable manner. The core rod 16 configured in this way forms a through-hole having a rectangular cross section with respect to the green compact formed in the cavity P.

In this molding die 10, at the time of molding, the first punch 13 is moved toward the second punch 14 by a pressurizing mechanism 50, and reduces the cavity P in the inserting/releasing direction Y to compact the powder W that is the molding target. The pressurizing mechanism 50 has a first pressing part 50*a* that can independently move only the first punch 13 up and down, and a second pressing part 50*b* that can independently move only the second die 12 up and down.

Figure 3:
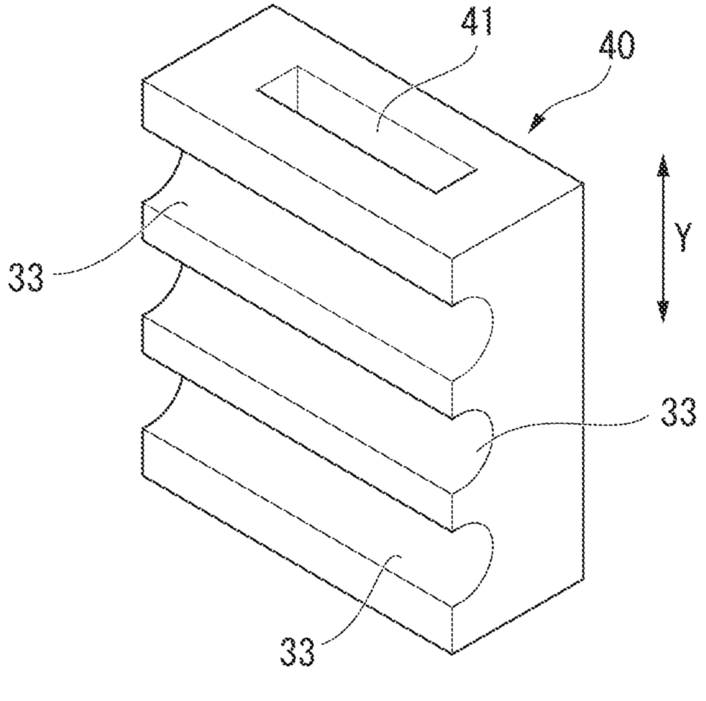
FIG. 3 is an exterior perspective view showing an example of a molding.

FIG. 3 is an exterior perspective view showing an example of the green compact (the molding) formed using the molding die 10 having this constitution. The green compact 40 is an approximate cuboid, and includes a through-hole 41 that is formed in the center of the green compact 40 by the core rod 16 (see FIGS. 1 and 2) and has a rectangular cross section. Three grooves 33 that are molded by the corrugation 31 of the undercut molding part 32 are provided on one surface of the green compact 40 (see FIGS. 1 and 2) and have an approximately semicircular cross section. These grooves 33 have an undercut shape that is a corrugation extending in the direction intersecting (or perpendicular to) the inserting/releasing direction Y when the green compact 40 is molded.

The undercut shape formed on the green compact (the molding) 40 has the plurality of grooves 33 that extend in one direction in the present embodiment, but the undercut shape is not limited thereto.

Figure 4:
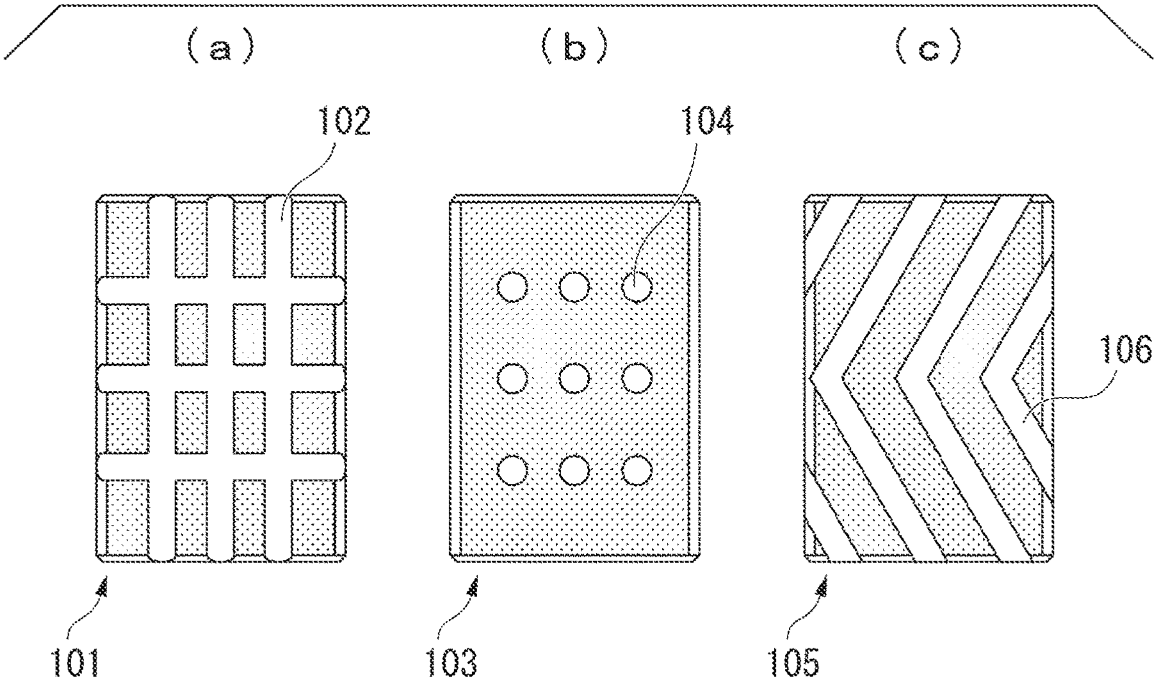
FIG. 4 is a top view showing examples of a shape of an undercut molding part.

Several specific examples of the undercut shape formed at the green compact (the molding) are shown in FIG. 4.

For example, a lattice-like undercut shape 102 in which a plurality of grooves are formed in two directions perpendicular to each other is molded on a green compact (a molding) 101 of FIG. 4(*a*). An undercut shape 104 in which a plurality of hemispherical dimples are arranged and formed is molded on a green compact (a molding) 103 of FIG. 4(*b*). An undercut shape 106 in which a plurality of grooves extending to be bent in a chevron shape are arranged and formed is molded on a green compact (a molding) 105 of FIG. 4(*c*).

Each of inverted shapes of the undercut shapes 102, 104 and 106 of these embodiments is provided on the undercut molding part 32 of the second die 12 of the molding die 10, so that the green compacts (the moldings) 101, 103 and 105 shown in FIGS. 4(*a*) to 4(*c*) can be obtained.

In the embodiment of the molding die of the present invention which is described above, the example in which the molding die from which the green compact that is an example of the molding is obtained using the powder raw material as the molding target is presented, but the molding target is not limited to the powder. For example, a coarsely formed solid material may also be applied in the same way to so-called sizing of using the solid material as the molding target, introducing the solid material into the cavity of the molding die of the present invention, and molding the solid material in a predetermined shape.

A variety of forms such as an aggregated form, a granular form, or the like may be used as the molding target in addition to the powder or the coarsely formed solid material.

Molding Method: First Embodiment

Figure 5:
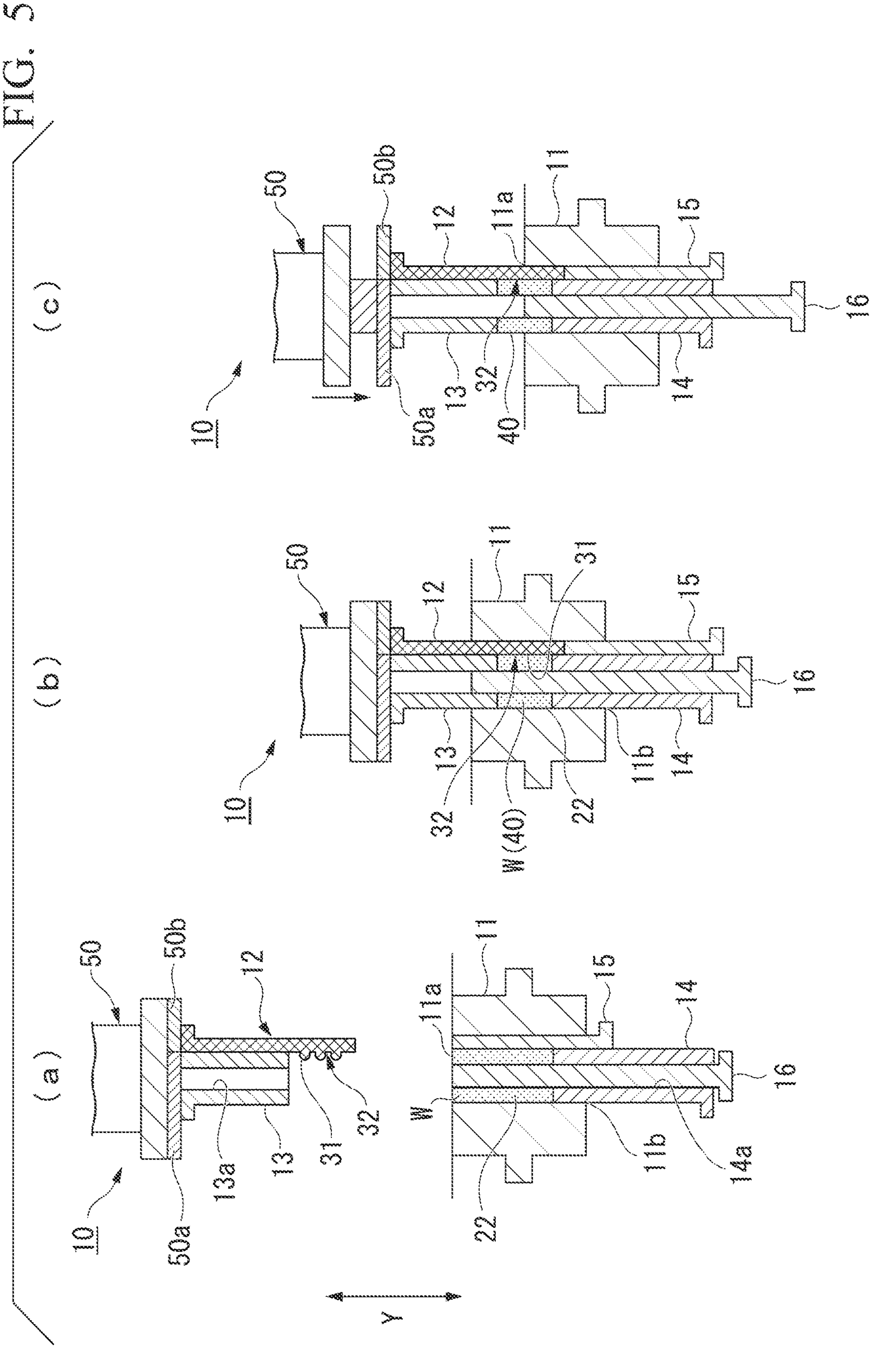
FIG. 5 is a sectional view showing a molding method according to a first embodiment of the present invention in a step-by-step manner.
Figure 6:
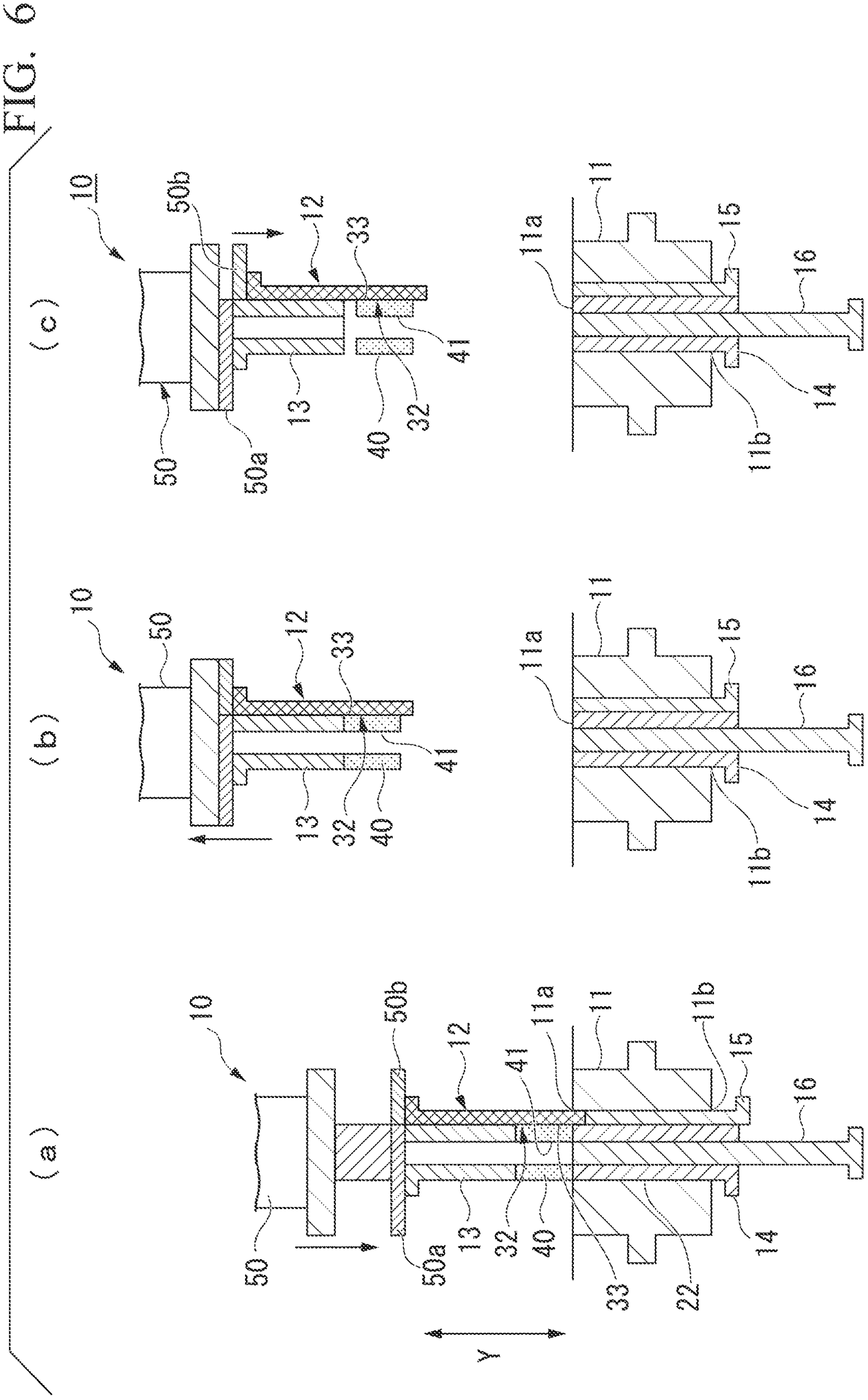
FIG. 6 is a sectional view showing the molding method according to the first embodiment of the present invention in a step-by-step manner.

A molding method of the present invention which uses the molding die having the constitution described above will be described. FIGS. 5 and 6 are sectional views showing a molding method of a first embodiment of the present invention in a step-by-step manner.

When the green compact 40 having the undercut shape, for instance, as shown in FIG. 3, is molded according to the molding method of the first embodiment of the present invention, the second punch 14 into which the core rod 16 is inserted and the third punch 15 are first inserted into the through-hole 22 from the second opening 11*b* of the first die 11 as shown in FIG. 5(*a*) (an inserting process). In this case, the second die 12 and the first punch 13 are located at a position at which they have retreated above the first die 11.

Next, a powder W used as a molding target is filled (introduced) in the through-hole 22 of the first die 11 (an introducing process). The powder W to be filled includes, for instance, an iron or copper powder that is mainly composed of a metal, a mixed powder thereof, or the like.

Next, as shown in FIG. 5(*b*), the pressurizing mechanism 50 is operated to lower the first punch 13 and the second die 12, and simultaneously inserts the first punch 13 and the second die 12 into the through-hole 22 from the first opening 11*a* of the first die 11 (an inserting process). Meanwhile, the second die 12 is lowered to push down the third punch 15, and comes into contact with the powder W with which the undercut molding part 32 of the second die 12 is filled. Thereby, a cavity P is defined in the through-hole 22 by the inner side walls 22*b*, 22*c* and 22*d* of the through-hole 22, the undercut molding part 32 of the second die 12, the entire circumferential surface of the core rod 16, the end face of the first punch 13, and the end face of the second punch 14.

In this way, in the state in which the cavity P is formed in the through-hole 22, the pressurizing mechanism 50 further pushes down the first punch 13 to compact the powder W (a compacting process). Due to the compacting process, the powder W is compacted in the cavity P, and a green compact (a molding) 40 modeled after an internal shape of the cavity P is molded. A through-hole 41 that is modeled after the core rod 16 and has a rectangular cross section is also molded at the same time.

During this compaction of the powder W, the compacted powder is pressed to the undercut molding part 32 of the second die 12, and the corrugation 31 protruding in the direction intersecting (or perpendicular to) the inserting/releasing direction Y is transferred.

Three grooves 33 formed in an undercut shape having an approximately semicircular cross section are molded in the green compact (the molding) 40.

As shown in FIG. 5(*c*), after the molding of the green compact (the molding) 40 is completed, the second punch 14 and the third punch 15 are raised while pressing down the green compact 40 with the first punch 13, and the first punch 13, the second die 12, and the green compact 40 are pulled out of the through-hole 22 (an ejecting process).

In this case, the second die 12 having the undercut molding part 32 by which the grooves 33 of the undercut shape are formed in the green compact 40 is pushed out of the through-hole 22 by pushing up the third punch 15 with the corrugation 31 brought into close contact with the grooves 33 of the green compact 40 (see FIG. 6(*a*)). The core rod 16 is fixed at the same position as the first die 11.

As shown in FIG. 6(*b*), the pressurizing mechanism 50 is moved upward in a state in which the green compact 40 is held on the first punch 13 and the second die 12.

Afterward, only the second pressing part 50*b* of the pressurizing mechanism 50 which is in contact with the second die 12 is slightly lowered, and thereby the second die 12 and the green compact 40 are moved relative to the first punch 13 to release an upper portion of the green compact 40 from a lower end face of the first punch 13 (see FIG. 6(*c*)).

Then, the green compact 40 is moved relative to the second die 12 in the direction intersecting (or perpendicular to) the inserting/releasing direction Y, and is removed from the second die 12. Thereby, the green compact (the molding) 40 in which the grooves 33 of the undercut shape as shown in FIG. 3 are formed and the through-hole 41 is also formed at the same time can be obtained.

As described above, according to the molding die and molding method of the present invention, the highly precise undercut shape (the grooves 33 in the present embodiment) can be easily molded for the green compact (the molding) 40 by simply inserting the second die 12 having the undercut molding part 32 into the through-hole 22 of the first die 11 and performing molding.

The green compact (the molding) 40 having this undercut shape is ejected from the through-hole 22 of the first die 11 along with the first punch 13 and the second die 12, so that the green compact (the molding) 40 can be released without damaging the undercut shape.

Thereby, as in the related art, the green compact (the molding) 40 having this undercut shape can be molded with ease and with high precision without using, for instance, the die having dividable dies.

In the molding die and molding method of the aforementioned embodiment, only the second die that can be moved relative to the first die is used as the die having the undercut molding part. However, a molding having a more complicated undercut shape may be molded by inserting the plurality of dies having the undercut molding part into the through-hole of the first die.

Molding Method: Second Embodiment

A molding method of a second embodiment of the present invention is an example in which the second die 12 disposed at the upper side in the first embodiment is disposed at a lower side.

Figure 7:
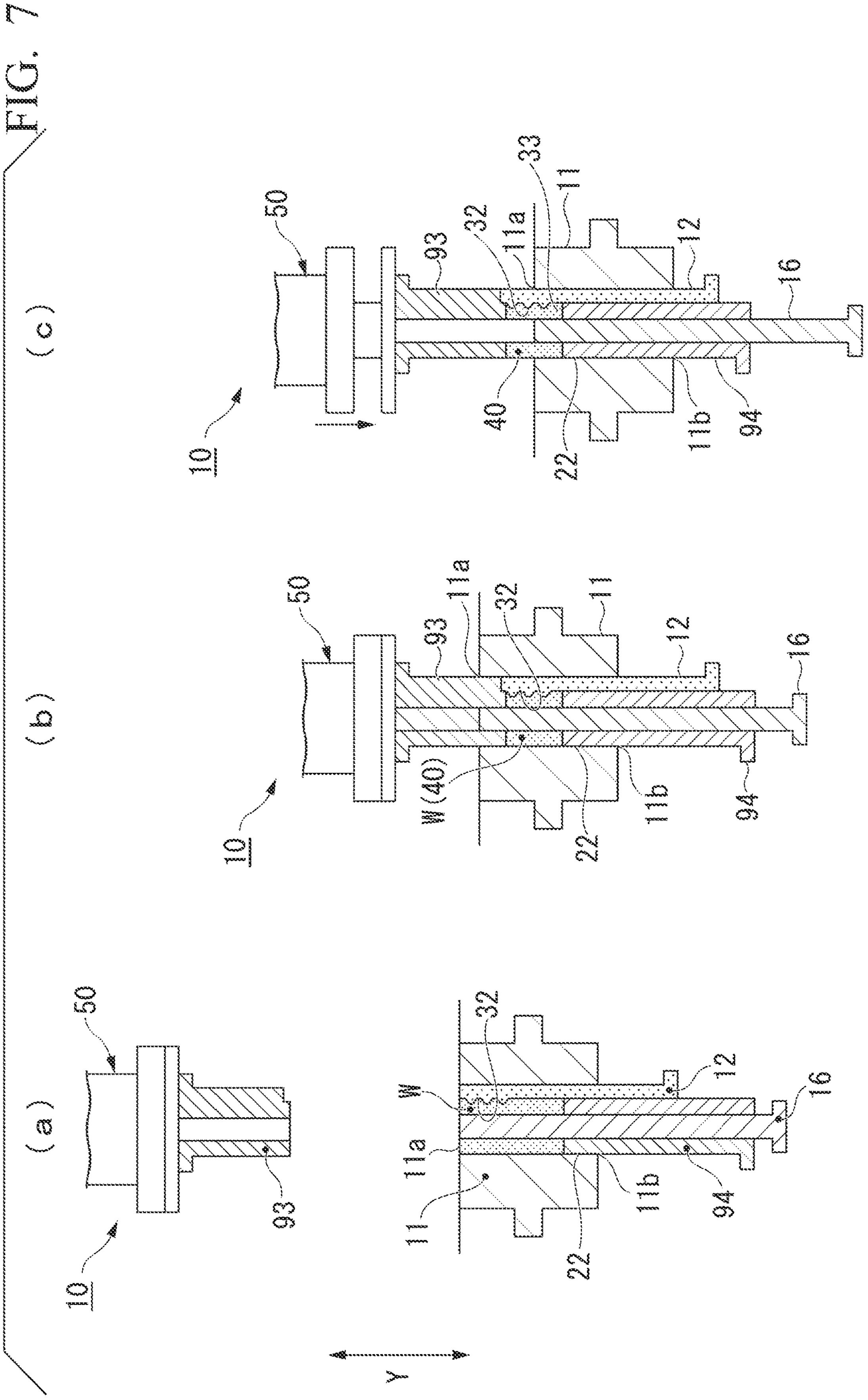
FIG. 7 is a sectional view showing a molding method according to a second embodiment of the present invention in a step-by-step manner.
Figure 8:
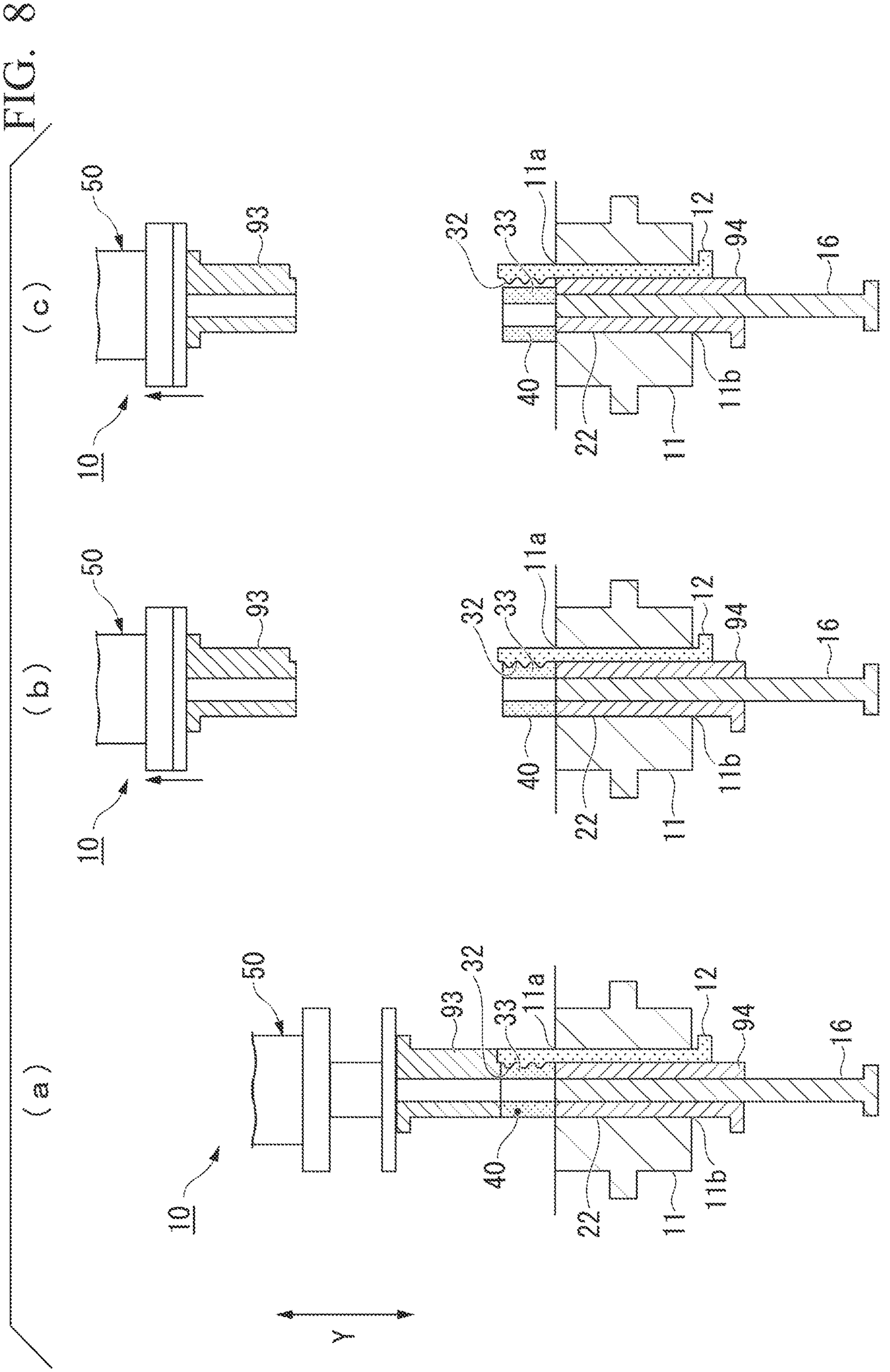
FIG. 8 is a sectional view showing the molding method according to the second embodiment of the present invention in a step-by-step manner.

FIGS. 7 and 8 are sectional views showing a molding method of a second embodiment of the present invention in a step-by-step manner.

Components that are the same as those of the molding method of the first embodiment shown in FIGS. 5 and 6 will be given the same reference signs, and duplicate descriptions will be omitted.

When the green compact 40 having the undercut shape, for instance, as shown in FIG. 3, is molded by the molding method of the second embodiment of the present invention, a second punch 94 into which the core rod 16 is inserted and the second die 12 are first inserted into the through-hole 22 from the second opening 11*b* of the first die 11 as shown in FIG. 7(*a*) (an inserting process). In this case, a first punch 93 is located at a position at which it has retreated above the first die 11.

Next, a powder W used as a molding target is filled (introduced) in the through-hole 22 of the first die 11 (an introducing process). The powder W to be filled includes, for instance, an iron or copper powder that is mainly composed of a metal, a mixed powder thereof, or the like.

Next, as shown in FIG. 7(*b*), the pressurizing mechanism 50 is operated to lower the first punch 93, and inserts the first punch 93 into the through-hole 22 from the first opening 11*a* of the first die 11 (an inserting process). The filled powder W is pressed to the undercut molding part 32 of the second die 12. Thereby, a cavity P is defined in the through-hole 22 by the inner side walls 22*b*, 22*c* and 22*d* of the through-hole 22, the undercut molding part 32 of the second die 12, the entire circumferential surface of the core rod 16, an end face of the second punch 94, and an end face of the first punch 93.

In this way, in the state in which the cavity P is formed in the through-hole 22, the pressurizing mechanism 50 further pushes down the first punch 93 to compact the powder W (a compacting process). Due to the compacting process, the powder W is compacted in the cavity P, and a green compact (a molding) 40 modeled after an internal shape of the cavity P is molded. A through-hole 41 that is modeled after the core rod 16 and has a rectangular cross section is also molded at the same time.

During this compaction of thee powder W, the compacted powder is pressed to the undercut molding part 32 of the second die 12, and the corrugation 31 protruding in the direction intersecting (or perpendicular to) the inserting/releasing direction Y is transferred.

Three grooves 33 formed in an undercut shape having an approximately semicircular cross section are molded in the green compact (the molding) 40.

As shown in FIG. 7(*c*), after the molding of the green compact (the molding) 40 is completed, the first punch 93 and the second die 12 are raised while the green compact 40 is supported with the second punch 94, and the second punch 94, the undercut molding part 32 of the second die 12, and the green compact 40 are pulled out of the through-hole 22 (an ejecting process). The second die 12 having the undercut molding part 32 by which the grooves 33 of the undercut shape are formed in the green compact 40 is pushed out of the through-hole 22 with the corrugation 31 brought into close contact with the grooves 33 of the green compact 40 (see FIG. 8(*a*)). The core rod 16 is fixed at the same position as the first die 11.

As shown in FIG. 8(*b*), the first punch 93 retreats upward.

Afterward, the green compact (the molding) 40 is moved in a transverse direction, and is released from an upper end face of the second punch 94 and the undercut molding part 32 of the second die 12 (see FIG. 8(*c*)).

As described above, according to the molding method of the second embodiment of the present invention, the highly precise undercut shape (the grooves 33 in the present embodiment) can be easily molded for the green compact (the molding) 40 by simply inserting the second die 12 having the undercut molding part 32 into the through-hole 22 of the first die 11 and performing molding.

The green compact (the molding) 40 having this undercut shape is ejected from the through-hole 22 of the first die 11 along with the first punch 93 and the second die 12, so that the green compact (the molding) 40 can be released without damaging the undercut shape.

Thereby, as in the related art, the green compact (the molding) 40 having this undercut shape can be molded with ease and with high precision without using, for instance, the die having dividable dies.

Figure 9:
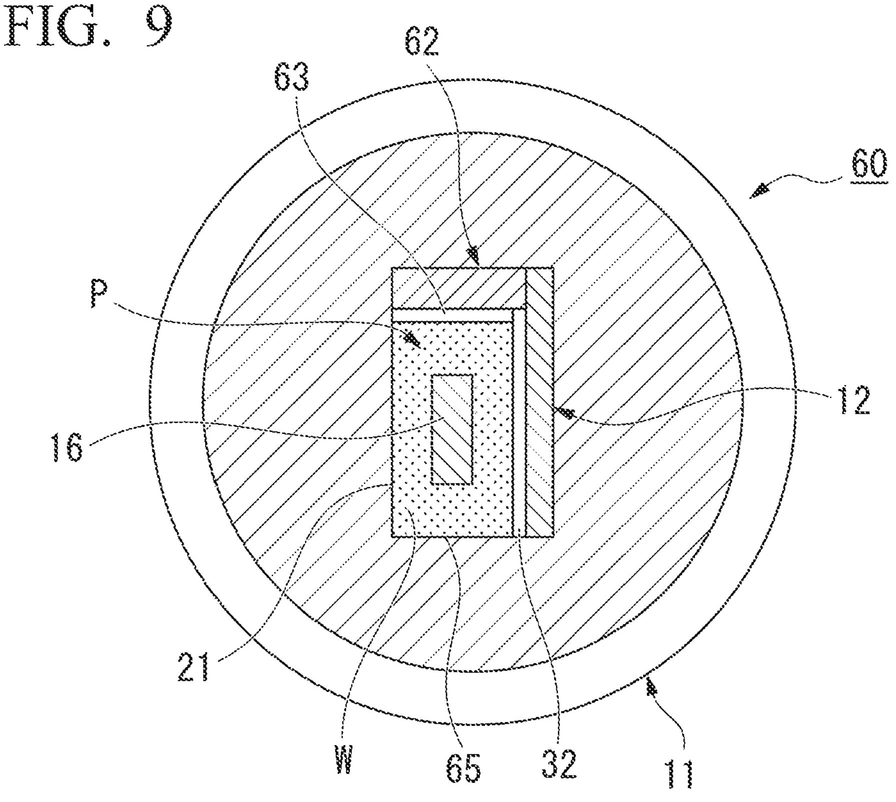
FIG. 9 is an upper sectional view showing a molding die according to another embodiment of the present invention.

FIG. 9 is an upper sectional view showing another embodiment of the molding die of the present invention. Components that are the same as those of the first embodiment shown in FIG. 1 will be given the same reference signs, and duplicate descriptions will be omitted.

A molding die 60 of another embodiment shown in FIG. 9 includes a second die 12 and a third die 62 that can be inserted into a through-hole 22 of a first die 11. Undercut molding parts 32 and 63 are formed at the second die 12 and the third die 62. Thereby, a cavity P surrounded by an inner side wall of the first die 11, the second die 12, the third die 62, the end face of a first punch, and the end face of a second punch is formed in the through-hole 22.

According to the molding die 60 having this constitution, the undercut shapes can be formed on two sides of a cuboidal molding 65.

Figure 10:
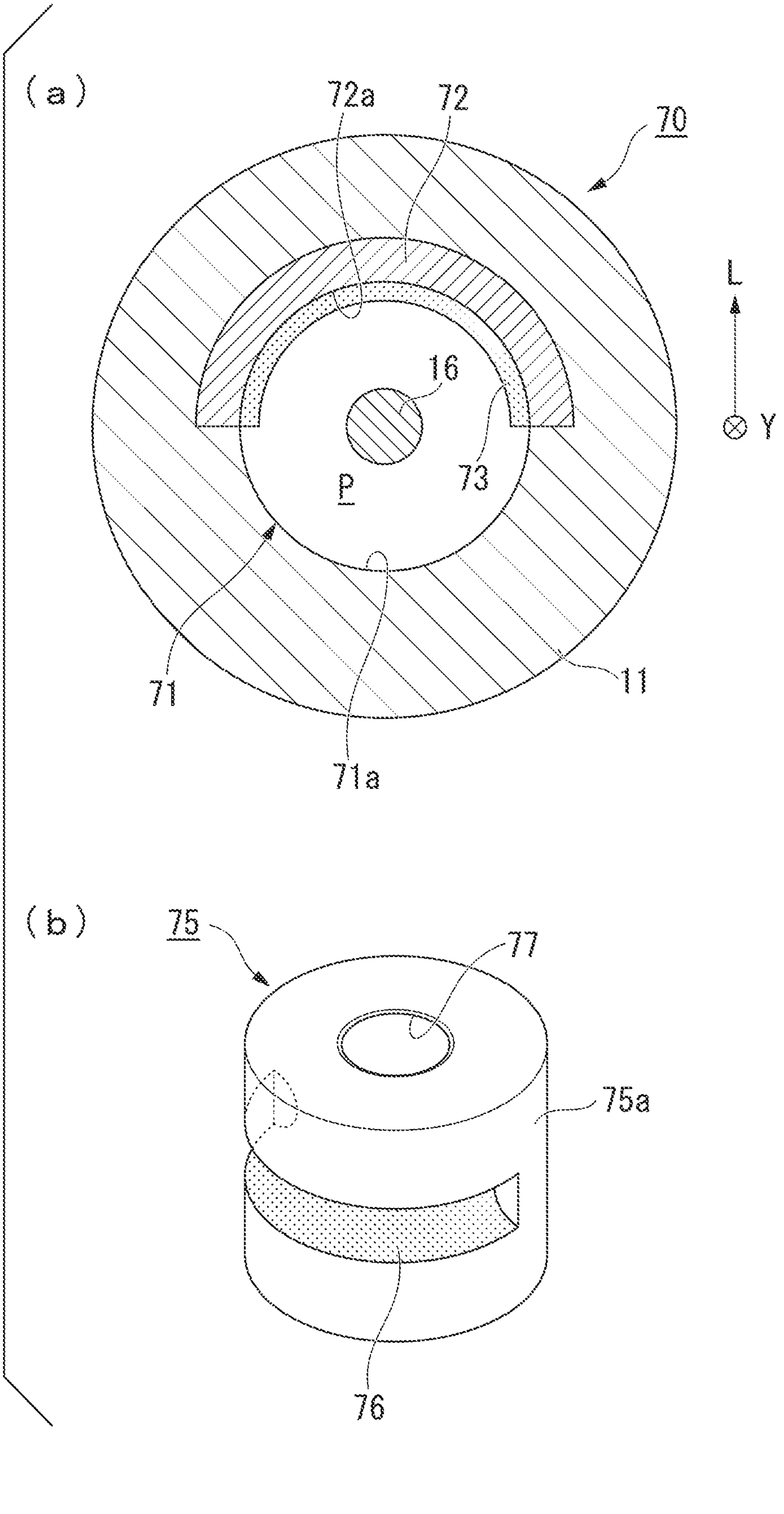
FIG. 10 is an upper sectional view showing a molding die according to another embodiment of the present invention, and is an exterior perspective view showing a molding.

FIG. 10(*a*) is an upper sectional view showing another embodiment of the molding die of the present invention. FIG. 10(*b*) is an exterior perspective view showing an example of a molding obtained by the molding die of the present embodiment. Components that are the same as those of the first embodiment shown in FIG. 1 will be given the same reference signs, and duplicate descriptions will be omitted.

A molding die 70 of another embodiment shown in FIG. 10 has an approximately cylindrical through-hole 71 formed in a first die 11, and includes a second die 72 that can be inserted into the through-hole 71. The second die 72 is a plate-like member that is in contact with an inner side wall 71*a* of the through-hole 71 formed in the first die 11 and is curved in a semicircular shape of 180°. An undercut molding part 73 is formed on an inner circumferential surface 72*a* of the second die 72, has a semicircular cross section, and extends in one direction of the inner circumferential surface 72*a*.

Thereby, a cavity P surrounded by the inner side wall 71*a* of the first die 11, the inner circumferential surface 72*a* of the second die 72 on which the undercut molding part 73 is formed, the end face of a first punch, and the end face of a second punch is formed in the through-hole 71. A core rod 16 having a circular cross section passes in the vicinity of the center of the cavity P.

After a molding 75 is molded using the molding die 70 having this constitution, if the second die 72 is extracted from the first die 11 in an inserting/releasing direction Y along with the molding 75, and is further moved in a horizontal direction L, then the molding 75 is released from the second die 72. As shown in FIG. 10(*b*), the molding 75 including an undercut shape 76 made up of a groove having a semicircular cross section only in an area of half of a circumferential surface 75*a* of the cylindrical molding 75 and having a through-hole 77 formed in a central portion of the cylindrical molding 75 can be molded.

Figure 11:
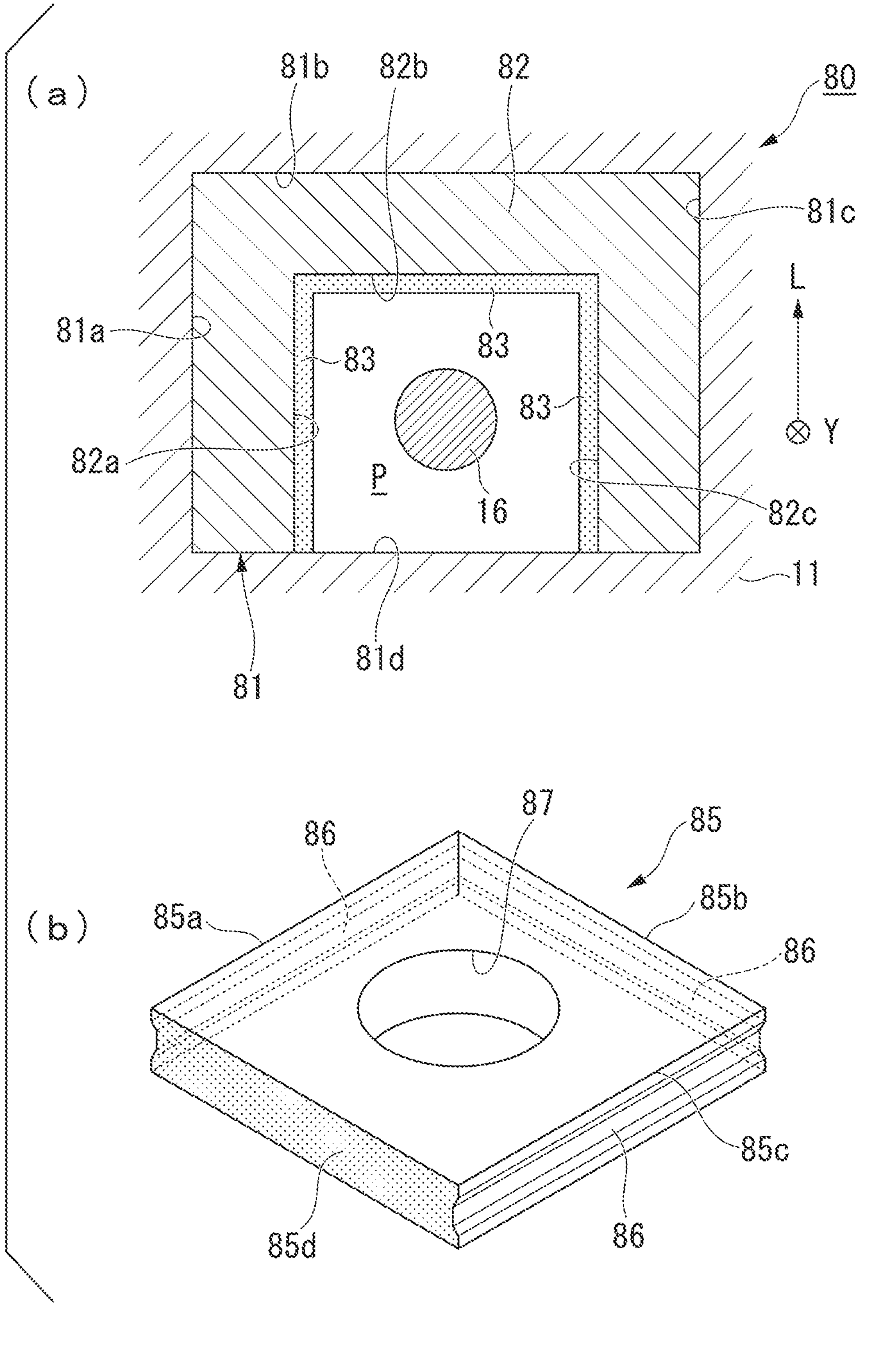
FIG. 11 is an upper sectional view showing a molding die according to another embodiment of the present invention, and is an exterior perspective view showing a molding.

FIG. 11(*a*) is an upper sectional view showing another embodiment of the molding die of the present invention. FIG. 11(*b*) is an exterior perspective view showing an example of a molding obtained by the molding die of the present embodiment. Components that are the same as those of the first embodiment shown in FIG. 1 will be given the same reference sign, and duplicate descriptions will be omitted.

A molding die 80 of another embodiment shown in FIG. 11 has an approximately cuboidal through-hole 81 formed in a first die 11, and includes a second die 82 that can be inserted into the through-hole 81. The second die 82 is a plate-like member that is in contact with three inner side walls 81*a* to 81*c* among four inner side walls 81*a* to 81*d* of the through-hole 81 formed in the first die 11 and is formed in a U shape. An undercut molding part 83, which has an approximately trapezoidal cross section and extends in one direction of each of inner side walls 82*a* to 82*c*, is formed at the second die 82.

Thereby, a cavity P is formed in the through-hole 81 by the inner side wall 81*d* of the first die 11, the inner side walls 82*a* to 82*c* of the second die 82 at which the undercut molding part 83 is formed, an end face of a first punch, and an end face of a second punch. A core rod 16 having a circular cross section passes in the vicinity of the center of the cavity P.

After a molding 85 is molded using the molding die 80 having this constitution, if the second die 82 is extracted from the first die 11 in an inserting/releasing direction Y along with the molding 85, and the second die 82 is further moved in a horizontal direction L, then the molding 85 is released from the second die 82. As shown in FIG. 11(*b*), the molding 85 including undercut shapes 86, each of which is made up of a groove having a trapezoidal cross section, at three sides 85*a* to 85*c* among four sides 85*a* to 85*d* of the cuboidal molding 85 and having a through-hole 87 formed in a central portion of the cuboidal molding 85 can be molded.

In the embodiments of the molding method of the present invention described above, the example in which the green compact that is an example of the molding is obtained using the powder raw material as the molding target is presented, but the molding target is not limited to the powder. For example, a coarsely formed solid material may also be applied in the same way to so-called sizing of using the solid material as the molding target, introducing the solid material into the cavity of the molding die of the present invention, and molding the solid material in a predetermined shape.

A variety of forms such as an aggregated form, a granular form, or the like may be used as the molding target in addition to the powder or the coarsely formed solid material.

While several embodiments of the present invention have been described, these embodiments are presented by way of example, and are not intended to limit the scope of the invention. These embodiments can be carried out in various other forms, and various omissions, substitutions, and modifications are possible without departing from the spirit and scope of the present invention. These embodiments or modifications thereof are included in the scope or the spirit of the invention, and are included in the invention described in the claims and the scope equivalent to the claims.

INDUSTRIAL APPLICABILITY

According to the molding die and molding method of the present invention, a molding including an undercut shape can be molded with high precision and with ease.

REFERENCE SIGNS LIST

10, 70, 80 Molding die
11 First die 12, 72, 82 Second die
13, 93 First punch
14, 94 Second punch
15 Third punch
16 Core rod
22, 71, 81 Through-hole
22*a* to 22*d*, 71*a*, 81*a* to 81*d* Inner side wall
32, 63, 73, 83 Undercut molding part
40, 65, 75, 85 Green compact (molding)
62 Third die
P Cavity

The invention claimed is:

1. A molding die comprising:
a first die having a through-hole;
a second die inserted into the through-hole from a first direction of the through-hole and configured to be movable relative to the first die in an inserting/releasing direction;
a first punch configured to be insertable into the through-hole from the first direction of the through-hole,
a second punch configured to be insertable into the through-hole from a second direction of the through-hole opposite to the first direction;
a third punch configured to be insertable into the through-hole from the second direction of the through-hole; and
a pressurizing mechanism including a first pressing part that independently moves only the first punch in the inserting/releasing direction, and a second pressing part that independently moves only the second die in the inserting/releasing direction, said pressurizing mechanism being configured to move the first punch and the second die simultaneously in compressing a molding target, wherein
the molding target is compression-molded in a cavity surrounded by inner side walls of the through-hole, the second die, the first punch, and the second punch,
the second die comes into contact with an outer circumferential surface of the first punch, and is configured to be slidable relative to the first punch in the inserting/releasing direction,
the second die is extended in the second direction farther than the first punch in the cavity,
an undercut molding part having a corrugation that extends in a direction intersecting the inserting/releasing direction is formed in a side surface of the second die configuring one portion of the cavity,
the first punch and the second die are simultaneously moved in compressing the molding target,
the third punch comes into contact with an outer circumferential surface of the second punch, and is configured to be slidable relative to the second punch in the inserting/releasing direction, and
an end of the third punch in the second direction and an end of the second die in the first direction are arranged to face each other.

2. The molding die according to claim 1, wherein the second die is inserted into the through-hole such that a part of the second die comes into contact with the inner side walls of the through-hole.

3. The molding die according to claim 1, further comprising a third die inserted into the through-hole such that a part of the third die comes into contact with the inner side walls of the through-hole, and configured to be movable relative to the first and second dies.

4. The molding die according to claim 1, further comprising a core rod configured to be insertable into the cavity.

5. The molding die according to claim 1, wherein the molding target is a powder.

6. A molding method using the molding die according to claim 1, the molding method at least comprising:
an introducing process of inserting the second punch and the third punch from the second direction of the through-hole and introducing the molding target into the through-hole;
an inserting process of simultaneously inserting the first punch and the second die from the first direction of the through-hole;
an operating process of operating the pressurizing mechanism to simultaneously move the first punch and the second die;
a compacting process of moving the first punch and the second punch toward each other, while contacting the third punch with the second die and compression-molding the molding target in the cavity, and molding a molding; and
an ejecting process of ejecting the molding from the molding die.

7. The molding method according to claim 6, wherein the ejecting process is a process of pulling the first punch, the second die, and the molding out of the through-hole, moving the second die and the molding relative to the first punch to remove the molding from the first punch, and moving the molding relative to the second die in a direction intersecting the inserting/releasing direction to remove the molding from the second die.

8. A molding die comprising:
a first die having a through-hole;
a second die inserted into the through-hole from a second direction of the through-hole and configured to be movable relative to the first die in an inserting/releasing direction; and
a first punch configured to be insertable into the through-hole from a first direction of the through-hole opposite to the second direction;
a second punch configured to be insertable into the through-hole from the second direction; and
a pressurizing mechanism which brings the first punch into contact with the second die while moving each other, said pressuring mechanism including a first pressing part that independently moves only the first punch in the inserting/releasing direction, and a second pressing part that independently moves only the second die in the inserting/releasing direction, wherein
a molding target is compression-molded in a cavity surrounded by inner side walls of the through-hole, the second die, the first punch, and the second punch,
the second die is extended in the second direction farther than the second punch inside the cavity,
an undercut molding part having a corrugation that extends in a direction intersecting the inserting/releasing direction is formed in a side surface of the second die configuring one portion of the cavity, and
an end of the first punch in the first direction comes into contact with a front end of the second die in the second direction.

9. A molding method using the molding die according to claim 8, the molding method at least comprising:
an introducing process of inserting the second punch and the second die from the second direction of the through-hole and introducing the molding target into the through-hole;
an inserting process of inserting the first punch from the first direction of the through-hole;

a compacting process of moving the first punch and the second punch toward each other, compression-molding the molding target in the cavity, and molding a molding; and an ejecting process of ejecting the molding from the molding die.

10. A molding die comprising:

a first die having a through-hole;

a second die inserted into the through-hole from a first direction of the through-hole and configured to be movable relative to the first die in an inserting/releasing direction;

a first punch configured to be insertable into the through-hole from the first direction of the through-hole, a second punch configured to be insertable into the through-hole from a second direction of the through-hole opposite to the first direction; and a pressurizing mechanism including a first pressing part that independently moves only the first punch in the inserting/releasing direction toward the second direction, and a second pressing part that independently moves only the second die in the inserting/releasing direction toward the second direction, wherein a molding target is compression-molded in a cavity surrounded by inner side walls of the through-hole, the second die, the first punch, and the second punch, an undercut molding part having a corrugation that extends in a direction intersecting the inserting/releasing direction is formed in a side surface of the second die configuring one portion of the cavity, and the first punch and the second die are simultaneously moved in compressing the molding target.

* * * * *